United States Patent [19]

Takahashi et al.

[11] Patent Number: 4,989,682
[45] Date of Patent: Feb. 5, 1991

[54] CONTROL DEVICE OF ELECTRIC POWER STEERING SYSTEM FOR MOTOR VEHICLE

[75] Inventors: Tsutomu Takahashi; Saiichiro Oshita; Toyohiko Mouri, all of Tokyo, Japan

[73] Assignee: Fuji Jukogyo Kabushiki Kaisha, Tokyo, Japan

[21] Appl. No.: 331,812

[22] Filed: Mar. 31, 1989

[30] Foreign Application Priority Data

Apr. 6, 1988 [JP] Japan .................. 63-84384

[51] Int. Cl.$^5$ .............................................. B62D 5/04
[52] U.S. Cl. ................................ 180/79.1; 364/424.05
[58] Field of Search .................. 180/79.1; 364/424.05

[56] References Cited

U.S. PATENT DOCUMENTS 4,708,220 11/1987 Noto et al. ............... 364/424.05
4,800,975 1/1989 Oshita et al. ............. 364/424.05

FOREIGN PATENT DOCUMENTS 61-115771 3/1986 Japan .
194973 8/1987 Japan ................... 180/79.1

Primary Examiner—Charles A. Marmor
Assistant Examiner—Eric Culbreth
Attorney, Agent, or Firm—Beveridge, DeGrandi & Weilacher

[57] ABSTRACT

Power assist of steering wheel by an electric motor is carried out by the sum of an assist motor current generated based on the output of a torsion torque sensor and a compensating current generated in dependency on the variation rate of the output of the torsion torque sensor. An assist torque current correction circuit controls the compensating current such that the amount of the compensating current is reduced in accordance with an increase in steering angle of the steering system.

9 Claims, 2 Drawing Sheets

CONTROL DEVICE OF ELECTRIC POWER STEERING SYSTEM FOR MOTOR VEHICLE

BACKGROUND OF THE INVENTION

The present invention relates to a control device of an electric power steering system for a motor vehicle.

There is known an electric power steering system for a motor vehicle wherein a steering force is assisted by the output of an electric motor for reducing the steering force. However, in the steering system of this kind, a response delay of an electric signal transmitted through an electric circuit produces a time delay between the detection of the steering force by a torque sensor and the generation of the assisting force in the electric motor. The time delay causes resistance force against outer disturbance to reduce and thus self-oscillations may occur when the steering wheel is turned while the motor vehicle stops. Furthermore, under the effect of inertia of the electric motor and friction of the speed-reduction mechanism, the response characteristics of the power steering system is reduced, and then the driver feels uncomfortable.

In order to overcome the above described difficulty, a device wherein a signal proportional to the differential of the torque signal is added to the torque signal of the steering shaft has been proposed by the applicant of the present invention, and is now published as Japanese Pat. Laid-Open No. 115771/1986. However, if the control of the steering wheel is too sensitive and the assist force of the electric motor is large even at a small steering angle, the steering force would be reduced and light, and the response characteristic of the steering operation would be much improved, while the motor vehicle is running on a straight road. To the contrary, if the steering wheel is turned greatly and quickly, the steering operation becomes too sensitive, and adverse effect of over-steering tends to occur.

SUMMARY OF THE INVENTION

An object of the present invention is to provide a control device of an electric power steering system wherein the above described difficulties of the conventional device can be substantially eliminated.

Another object of the present invention is to provide a control device of an electric power steering system, the construction of which is simple and economical.

The objects of the present invention can be achieved by a control device of an electric power steering system for a motor vehicle, wherein power assist of an electric motor is controlled by an addition of an assist motor current which is generated from an assist torque current generator based on the output of a torsion torque sensor, and by compensating current which is generated from a compensating current generator based on the variation rate of the output of the torsion torque sensor, characterized in that the control device further comprises an assist torque current correction circuit which controls the compensating current generated from the compensating current generator so as to reduce the compensating current in accordance with an increase of steering angle of the steering system.

The other objects and features of this invention will become understood from the following description with reference to the accompanying drawings.

DESCRIPTION OF THE PREFERRED EMBODIMENTS

Before entering the description of the invention, a conventional construction of the control device of the electric power steering system will be described in more detail.

Figure 1:
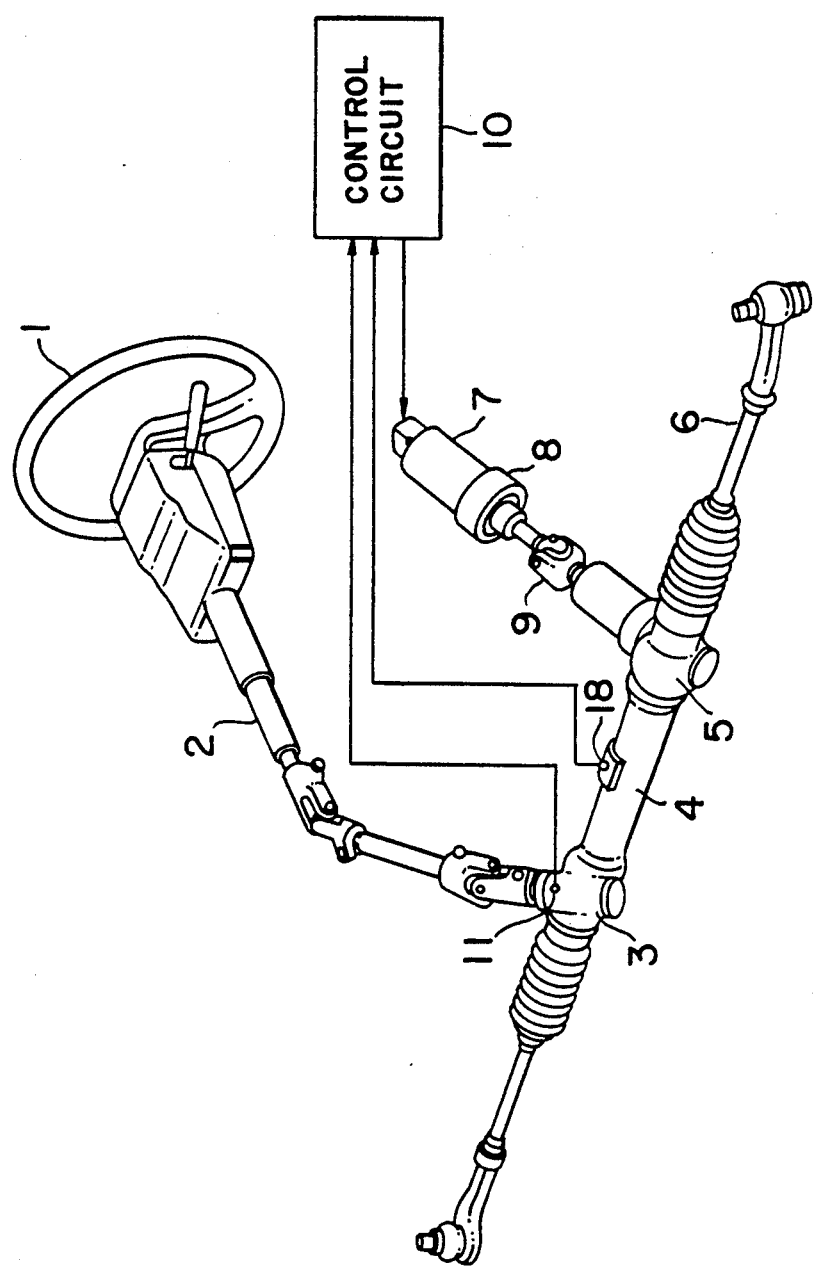
FIG. 1 is a diagrammatic illustration of a power steering system according to the present invention.

Referring to FIG. 1, a steering system is a rack-and-pinion type and comprises a steering wheel 1 connected to a steering shaft 2 for steering front wheels. The steering shaft 2 is rotatably connected to the front wheels via a steering gear box 3 and a pinion and rack 4 operatively interconnected to each other.

Another rack-and-pinion device 5 is engaged with the rack 6. The pinion is operatively connected with an output shaft 9 of a reduction gear device 8 attached to a motor 7. A torsion torque sensor 11 is provided on gear box 3 for measuring the torsion torque of the steering shaft 2, and a steering angle sensor 18 is provided adjacent to the rack 4 so as to measure the axial movement of the rack 6 corresponding to the steering angle of steering wheels of vehicle. The outputs of the sensors 11 and 18 are applied to a control circuit 10 of the present invention.

The control circuit 10 is connected to the motor 7.

Figures 3, 4, 5:
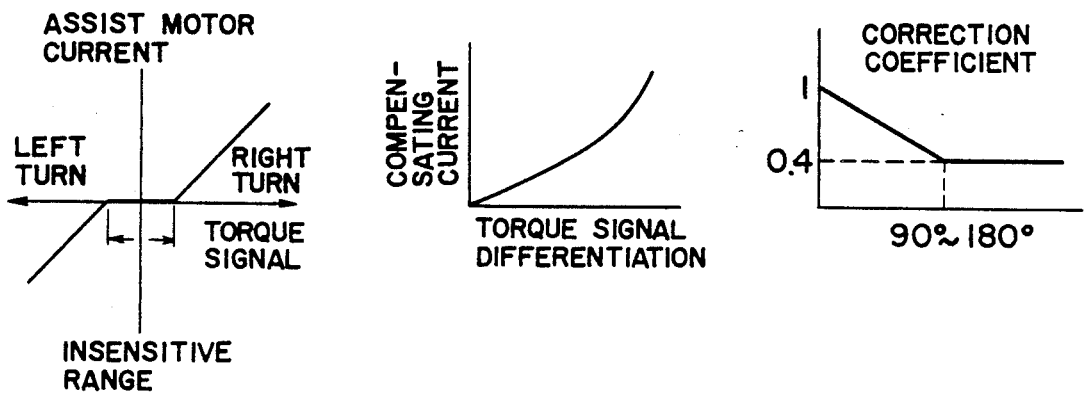
FIG. 3 is a diagram showing the variation of an assist motor current in accordance with the torque signal.
FIG. 4 is a diagram showing a relation between a compensating current ip and the differentiation of the torque signal.
FIG. 5 is a diagram showing the variation of a correction coefficient k according to the steering angle.

According to the present invention, in the conventional control device for controlling the above described power steering system, a torsion torque sensor 11 is provided to detect a torsion torque created in the steering shaft 2, and to provide a torque signal to an assist torque current generator 12. The assist torque current generator 12 generates an assist motor current i in dependency on the torque signal as shown in FIG. 3, and the assist motor current i is supplied to a motor driver 15 of the electric motor 7. A differentiation circuit 13 differentiates the torque signal obtained from the torque sensor 11, and the output of the circuit 13 is added to the torque signal applied to the assist torque current generator 12. The output of the differentiation circuit 13, is provided to a compensating current generator 14 and the compensating current generator 14 generates a compensating current ip which increases in accordance with the differentiated value of the torque signal as shown in FIG. 4.

The current ip is added to the assist motor current i, and the sum i+ip is applied to the motor driver 15. Receiving the added signal i+ip, the motor driver 15 drives the electric motor 7 of the power steering system in an assisting direction.

In the above described construction, the torque signal added to the output of the differentiation circuit 13 reduces the width of an insensitive range shown in FIG. 3, thereby preventing the occurrence of self-oscillation even in a case where steering is attempted while the vehicle stops. Furthermore, the compensating current ip added to the assist motor current i eliminates the adverse effect of the inertia of the assisting motor while the motor vehicle is running.

In the above described conventional construction of the control device, however, when the vehicle is running on a straight road and when frequent correction of small steering angle is required, and then if the current ip at that time is set at a large value in order to reduce the steering force only in a small angular range, the over-steering may occur in a quick and large angle steering operation.

Figure 2:
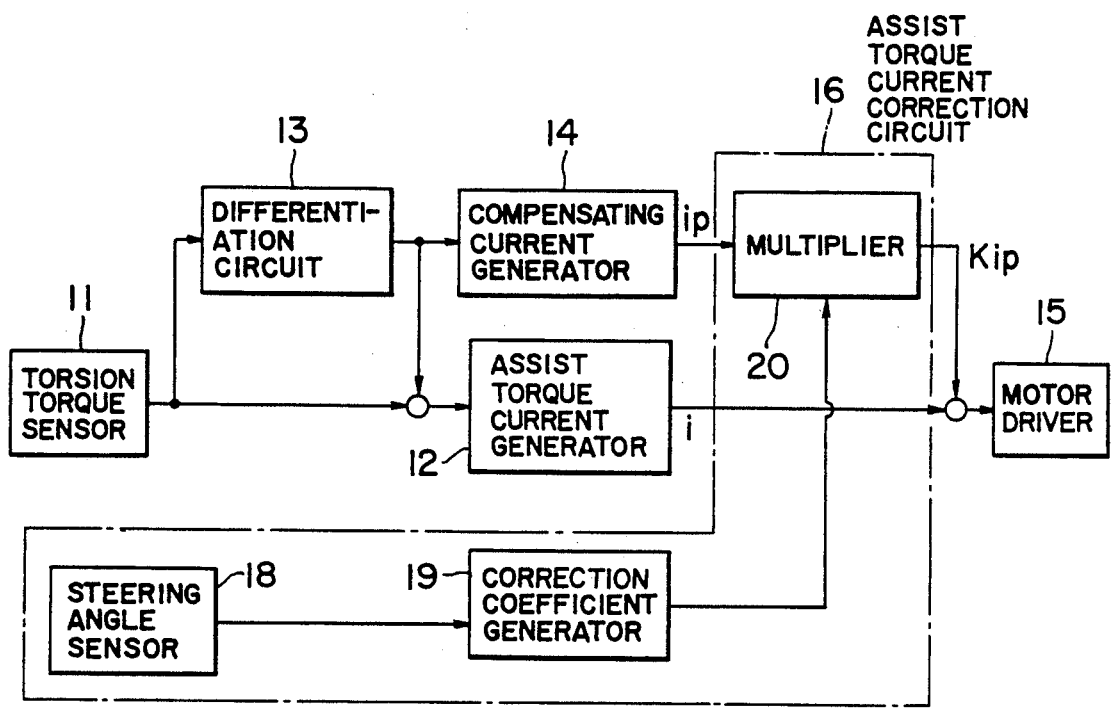
FIG. 2 is a block diagram of a control system of the present invention.

According to the present invention, an assist torque current correction circuit 16 comprising a steering angle sensor 18, correction coefficient generator 19, and a multiplier 20 is further provided in the control circuit as indicated in a portion surrounded by a one-dot-dash line in FIG. 2.

The correction coefficient generator 19 determines the value of a coefficient k as shown in FIG. 5, so that the value is 1 when the steering angle detected by the steering angle sensor 18 is equal to 0, whereas the value is reduced to, for instance, 0.4 when the steering angle increases to a predetermined range between 90° and 180°. The value of 0.4 is maintained regardless of further increase of the steering angle. Since the coefficient k reduces as the steering angle increases the assisting force of the electric motor 7 is reduced when the steering angle is large.

According to present invention, the assist torque current correction circuit 16 causes the coefficient k to eliminate motor inertia depending on the increase of the steering angle. As a consequence, the steering force required for correcting the steering angle on a straight road can be reduced substantially, while the steering force required for the quick and large angle steering increases such that the driver may feel an appropriate steering sensitivity against a resistance force from the road.

In this embodiment, the steering angle sensor 18 is required, however, it is applicable that the steering system has inherently the steering angle sensor which has a function of increasing a return steering force according to the steering angle.

It is also applicable that the coefficient k which reduces as the steering angle increase is multiplied to the compensating current ip. It is also becomes understood that the correction coefficient generator 19 produces another correction coefficient k', which increases as the steering angle increases, and the coefficient k' is subtracted from the compensating current ip.

According to the present invention, the compensating current ip decreases as the steering angle increases, so that steering force becomes light and response is improved while driving on a straight road which requires frequent correction of the small steering angle.

And furthermore, the steering force becomes greater and the driver feels an appropriate sensitivity when the steering wheel is turned suddenly and at a large angle.

Therefore, the steerability is improved by the simple and practical structure of the present invention.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. In a control device of an electric power steering system for a motor vehicle, wherein power assist due to an electric motor is actuated by an addition of an assist motor current, said assist motor current being generated from an assist torque current generator in dependency on an output signal from a torsion torque sensor, and a compensating current generator generates a compensating current in dependency on a variation rate of the output signal from the torsion torque sensor, the improved wherein the control device comprises, an assist torque current correction circuit including a steering angle sensor, a correction coefficient generator responsive to an output of said steering angle sensor generating a correction coefficient and a multiplier for multiplying said compensating current by said correction coefficient, said assist torque current correction circuit controlling said compensating current generated from said compensating current generator such that said compensating current reduces as a steering angle of said steering system increases.

2. The control device according to claim 1, wherein said correction coefficient varies in dependency on the steering angle detected by said steering angle sensor such that said coefficient reduces from a first predetermined value to a second predetermined value in accordance with an increase in the steering angle.

3. The control device according to claim 2, wherein said first predetermined value is 1.

4. The control device according to claim 2, wherein said second predetermined value is less than 1.

5. The control device according to claim 2, wherein said first predetermined value is set when the steering angle is equal to substantially zero.

6. The control device according to claim 2, wherein said second predetermined value is set when the steering angle reaches a predetermined range.

7. The control device according to claim 6, wherein said second predetermined value is maintained regardless of further increase of the steering angle over the predetermined range.

8. The control device according to claim 6, wherein said predetermined range is substantially between 90° and 180°.

9. A control device of an electric power steering system for a motor vehicle, having a torsion torque sensor detecting a torsion torque, an assist torque current generator for producing an assist motor current in dependency on an output signal from said torsion torque sensor, a compensating current generator for producing a compensating current in dependency on a variation rate of the output signal from said torsion torque sensor and an electric motor actuated by a current summing said assist motor current with said compensating current, said device comprising:

a steering angle sensor for detecting a steering angle of said steering system; and correction means responsive to an output signal of said steering angle sensor for correcting said compensating current generated from said compensating current generator such that said compensating current reduces with the increase of said steering angle, so as to control the response characteristics of the power steering system with respect to the steering condition;

said correction means comprising:

a correction coefficient generator responsive to the output signal of said steering angle sensor for generating a correction coefficient; and a multiplier for multiplying said compensating current by said correction coefficient.

* * * * *